United States Patent
Delcambre

[19]

[11] Patent Number: 6,062,160
[45] Date of Patent: May 16, 2000

[54] TRAILER BACKUP AND BOAT RELOAD GUIDE SYSTEM

[76] Inventor: Wayne Delcambre, 610 Magnolia Ave., New Iberia, La. 70560

[21] Appl. No.: 09/002,799

[22] Filed: Jan. 5, 1998

[51] Int. Cl.[7] ...................................................... B60D 1/40
[52] U.S. Cl. ........................... 116/28 R; 33/264; 280/477
[58] Field of Search ............................. 116/28 R; 33/264; 280/477

[56]                References Cited

U.S. PATENT DOCUMENTS

| | | | |
|---|---|---|---|
| 1,784,466 | 12/1930 | Rensonnet | ................................. 33/264 |
| 3,792,680 | 2/1974 | Allen | ....................................... 116/173 |
| 3,863,594 | 2/1975 | Gawthrop | .................................. 33/264 |
| 3,866,328 | 2/1975 | Alexander et al. | ........................ 33/264 |
| 3,966,231 | 6/1976 | Metzler . | |
| 4,666,176 | 5/1987 | Sand | .......................................... 33/264 |
| 4,905,376 | 3/1990 | Neeley . | |
| 4,940,251 | 7/1990 | Willmsen | ................................ 116/229 |
| 5,035,441 | 7/1991 | Murray . | |
| 5,036,593 | 8/1991 | Collier . | |
| 5,113,588 | 5/1992 | Walston | .................................... 33/264 |
| 5,269,554 | 12/1993 | Law et al. . | |
| 5,596,944 | 1/1997 | Massie | .................................. 116/28 R |
| 5,669,621 | 9/1997 | Lockwood | ................................. 33/264 |
| 5,755,453 | 5/1998 | Bell | ....................................... 116/28 R |

*Primary Examiner*—Andrew H. Hirshfeld
*Attorney, Agent, or Firm*—Garvey, Smith, Nehrbass & Doody, LLC

[57]                ABSTRACT

A guide member mountable on the rear portion of a carrier or boat trailer, which would include a mounting bracket for mounting onto a rear, for example, bumper of the trailer, a post portion hingedly engaged to the mounting bracket, the post portion having on its upper end a reflective surface in the shape of a circle or the like, and on its lower end, a counter weight. There is further provided a spring member engaged between the mounting bracket and the post, so that the guide would normally be in the vertical position with the reflective surface extending a distance above the trailer visible by the driver of the vehicle, but when a boat or other material is loaded onto the trailer, the guide would move into the horizontal position against the bias of the spring and the counter weight, held in the horizontal position by the material or both placed thereupon. When the boat or material is retrieved from the trailer and the trailer is empty, the guide would automatically spring to the vertical position for viewing by the driver of the vehicle.

13 Claims, 1 Drawing Sheet

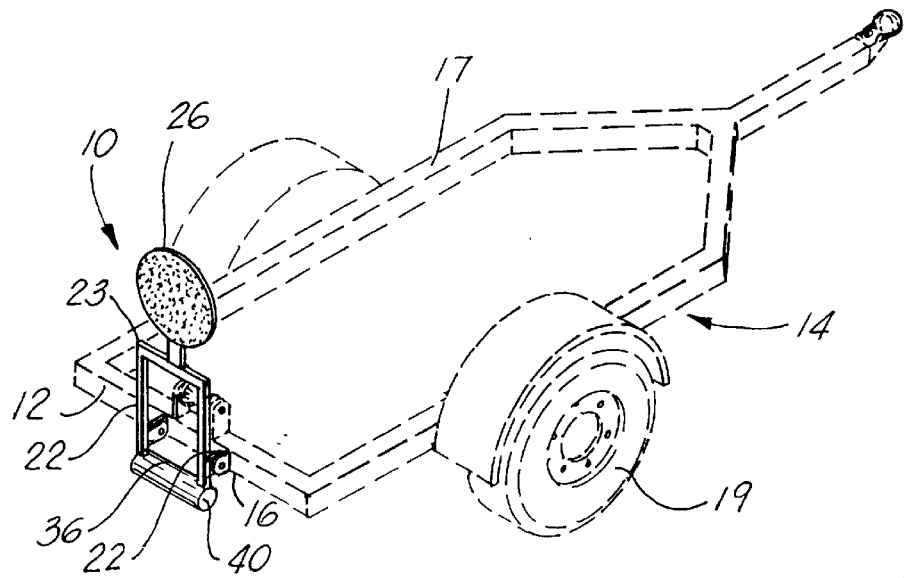
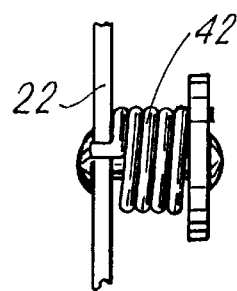
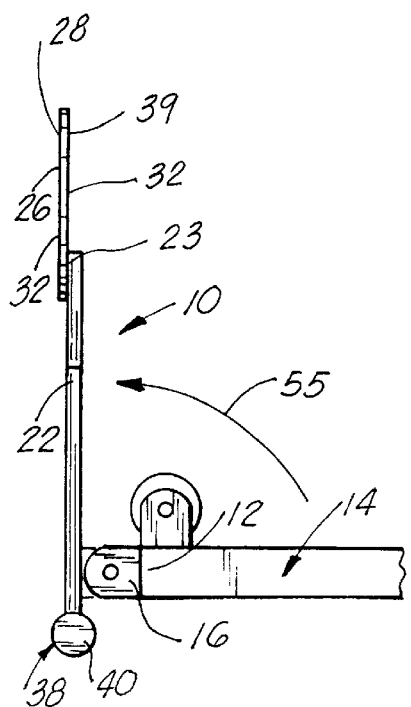
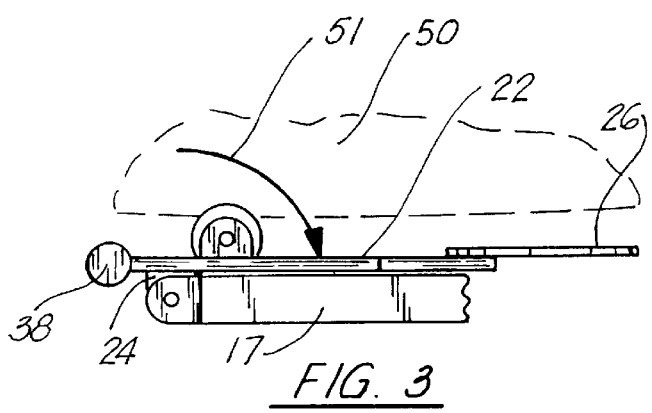

TRAILER BACKUP AND BOAT RELOAD GUIDE SYSTEM

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to guides for vehicles. More particularly, the present invention relates to a guide mountable on a trailer being pulled by a vehicle so that when the trailer is empty, the guide facilitates easier reloading of the trailer and the backing of the trailer to a particular point.

2. General Background of the Invention

When a trailer such as a carrier trailer or a trailer upon which a boat may be loaded, is pulled by a vehicle, one of the more difficult tasks that the driver of the vehicle has is to back the trailer to a predetermined position. One of the reasons for this is that the driver simply does not have the ability to see the position of the distal end of the trailer through the driver's rear view mirror or the like, and has no reference point by which the driver may judge where the center of the trailer is as it is being backed into position. An example of such a task is when a boat is going to be reloaded onto a trailer from for example a boat launching ramp, the trailer must be backed to a certain distance within the water, so that the boat may be placed on the trailer by floating it onto the trailer and then being winched the remainder of the way. However, in some cases, once the trailer has been placed in position in the water, the steerer of the boat is unable to judge the central axis of the trailer so as to point the central point of the bow of the boat along the central axis so as to guide it down the center of the trailer for winching. When an empty trailer must be backed to a certain position by the driver of the vehicle, it is quite difficult often times to make certain that the trailer is in the correct position without some means of having a reference point at the distal end of the trailer in order to move the trailer in the pre-determined position.

Therefore, there is a need in the art for a guide which can be positioned on the distal end of an empty carrier trailer or boat trailer, which is easily identifiable by the driver, either in daylight or night time, when the trailer is empty, yet when the trailer is filled or when a boat is placed on the trailer, the guide is able to be moved out of position, therefore, not interfering with the boat positioned on the trailer or the goods within the trailer.

BRIEF SUMMARY OF THE INVENTION

The present invention solves the problems in the art in a simple and straight forward manner. What is provided is a guide member mountable on the rear portion of a carrier or boat trailer, which would include a mounting bracket for mounting onto a rear, for example, bumper of the trailer, a post portion hingedly engaged to the mounting bracket, the post portion having on its upper end a reflective surface in the shape of a circle or the like, and on its lower end, a counter weight. There is further provided a spring member engaged between the mounting bracket and the post, so that the guide would normally be in the vertical position with the reflective surface extending a distance above the trailer visible by the driver of the vehicle, but when a boat or other material is loaded onto the trailer, the guide would move into the horizontal position against the bias of the spring and the counter weight, held in the horizontal position by the material or both placed thereupon. When the boat or material is retrieved from the trailer and the trailer is empty, the guide would automatically spring to the vertical position for viewing by the driver of the vehicle.

Therefore, it is a principal object of the present invention to provide a guide for an empty trailer so that a driver of a vehicle to which the trailer is attached may have a reference point for identifying the central axis of the trailer as it is being loaded or as it is being moved into a certain predetermined position.

It is a further object of the present invention to provide a guide for a boat trailer so that the guide is maintained in the horizontal inactive position when the boat is loaded onto the trailer but when the boat is removed from the trailer, the guide automatically springs to the vertical position for easy viewing by the driver of the vehicle.

It is a further object of the present invention to provide a guide mechanism which is normally in the vertical position when a boat trailer is empty, so that when the boat trailer is moved into the water for loading, the operator of the boat may use the guide as a central reference point upon which to steer the boat onto the central part of the trailer to enable the boat to be easily loaded onto the trailer.

It is a further object of the present invention to provide a guide which is normally in the vertical position on an empty carrier trailer so that the driver of the vehicle to which the trailer is attached may back the trailer into a position using the guide as a reference point of the central axis of the trailer as it is moving into position.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 1 illustrates an overall view of the preferred embodiment of the apparatus of the present invention;

FIG. 2 illustrates a side view of the preferred embodiment of the apparatus of the present invention mounted on the end of a trailer in the upright position;

FIG. 3 illustrates the preferred embodiment of the apparatus of the present invention mounted on a trailer in the horizontal position; and FIG. 4 illustrates an isolated view of the spring mechanism utilized in the apparatus of the present invention.

DETAILED DESCRIPTION OF THE INVENTION

FIGS. 1–4 illustrate the preferred embodiment of the apparatus of the guide assembly of the present invention by the numeral 10. As illustrated, guide assembly 10 as seen in FIG. 1 would be mountable onto the rear end 12 of a trailer 14. The trailer 14 would be of the type of trailer having a frame 17 and transportable on wheels 19. The trailer 14 is of the type that would transport a boat to and from the water. As illustrated, for example, the guide assembly 10 would comprise a mounting bracket 16, which would be securable to the rear end 12 of the trailer 14, with the mounting bracket 16 secured thereto via bolting or the like. In the preferred embodiment, the mounting bracket 16 of the guide would be securable to the rear end 12 of the trailer 10, substantially along a central axis of the trailer for the reasons as will be described further. As further illustrated, the guide assembly 10 would comprise a principal base portion 20, which may be a pair of tubes 22 or the like, which would be secured to the mounting bracket 16 via a hinge member 24, along a predetermined point along the length of each post 22, so that the posts 22 may be movable from a first vertical position to a second horizontal position as seen in FIGS. 2 and 3, for the reasons as will be described further.

Turning now to FIG. 2, as the guide assembly 10, there is further included on the upper end 23 of posts 22, a reflective means 26. Reflective means 26 may in the preferred embodiment comprise a circular member such as plastic or the like, which would have a first and second faces 28 and 30, and on the faces 28 and 30, there would be secured a reflective material 32, so that should light shine on the material, particularly at night, the material would glow or would reflect that light in the darkness. On the lower ends of the post members 22, there would be included a counter weight means 36. This counter weight means, in the preferred embodiment, may comprise a hollow tube 38, secured to the lower ends of the posts 22. The hollow tube 38, would include a cap member 40, so that water or sand or other material could be poured into the tube 38 and would be maintained in the tube 38 when the cap 40 is placed on the tube. Although FIG. 4 illustrates cap 40 located on one end of the tube 38, in the preferred embodiment, cap 40 may be located on any wall of the tube for facilitating pouring of fluid into the tube and sealing it. The tube 38 would serve as a counter weight so that when the guide 10 would naturally be in the vertical position due to the weight of the counter weight always maintaining the posts 22 upright. In the preferred embodiment, tube 38 may not be a hollow tube, but may be a solid tube made of a material or a composite material so as to provide sufficient weight to serve as a counter weight in the operation of the apparatus as is being described in this specification.

In order to assure further maneuverability of the posts 22 to the upright position, there would be included a spring member 42, which would be secured from the lower portion of the mounting bracket 16, to the post members 22, so that the post members 22 would always be moved to the vertical due to the biasing of the spring 42. It is foreseen that one may wish to construct the apparatus utilizing only the counter weight means 36 without the spring 42, or with utilizing the spring 42 without the counter weight means 36. However, as seen above, both the counter weight and the spring are being utilized in combination with the apparatus.

As seen in FIG. 2, the guide member 10 is seen in the normally vertical position when it is secured to the rear end 12 of an empty trailer. However, as seen in FIG. 3, when a boat trailer 14 is moved into the water, and a boat 50 (phantom view) is placed thereupon, the boat 50 would simply slide upon the trailer 14 and upon making contact with the guide 10, the guide would fold down to the horizontal position (arrow 51) against the weight of the boat 50, and would be maintained in that position while the boat 50 is loaded on the trailer 14.

As illustrated, when the boat is removed from the trailer and slid into the water for example, the guide 10 due to the tube counter weight 38, and the spring member 42 would return naturally to the vertical upright position as seen in FIG. 2, and due to the height of the posts 22 and the position of the reflective surfaces 32, the guide 10 would be easily viewable from the window or the mirror of the vehicle to which the trailer 14 is attached. That being the case, therefore, should the trailer be a boat trailer and have to be placed into the water a certain distance, the guide reflective surfaces 32 are of sufficient height so as to be maintained out of the water, so that when the boat 50 is reloaded onto the trailer 14, the steerer of the boat 50 would have a reference point to aim for the bow of the boat 50 at the reflective surfaces 32 which would insure that the boat 50 is travelling along the central axis of the trailer 14 and would be properly positioned on the trailer when the boat is winched in place.

Furthermore, for example, should the trailer 14 be a normal trailer 14 for carrying wood or the like, when the trailer is empty, the guide 10 again would be normally in the upright position, and the operator of the trailer 14 would then have a reference point along the central axis of the trailer 14 for backing the trailer into position for example, against a cargo bay so that cargo could be loaded onto the trailer. Of course, when the cargo is placed on the trailer 14, the weight of the cargo would naturally move the guide 10 from the vertical to the horizontal position and the guide 10 would be maintained in that position until the cargo was removed from the trailer and the guide would be reconfigured to the vertical upright position (arrow 55).

What is claimed is:

1. An apparatus in combination with a boat trailer for guiding the trailer into position for loading, and for assisting in the backing of the trailer when the trailer has been unloaded, the apparatus comprising:

a) a body portion comprising a pair of spaced apart leg members, lower ends of the leg members hingedly secured to a rear end of the boat trailer to straddle the midline of the trailer;

b) a reflective member positioned on upper ends of the leg members of the body portion, movable from an upright position to a horizontal position, the reflective member having a flat reflective face viewable from the cab of a vehicle towing the trailer while in the upright position;

c) the lower end of the body portion defining a counterweight for maintaining the body portion in a normally upright position when the trailer is empty; and d) the reflective member movable to the horizontal position when a boat is loaded onto the trailer.

2. The apparatus in claim 1, wherein the reflective member is positioned on the trailer midline so as to provide a reference point for a person driving the vehicle towing the trailer to determine the midpoint of the trailer as it is positioned to receive a boat.

3. The apparatus in claim 1, wherein the reflective member comprises a large circular body having a reflective material thereon.

4. The apparatus in claim 1, wherein the counterweight comprises a hollow tube positioned at the lower end of the body portion, the tube fillable with a material to provide weight to the tube.

5. The apparatus in claim 1, further comprising a spring member engaged between mounting brackets of the apparatus and the body portion, the spring member normally biased to maintain the reflective member in the upright position, and for returning the reflective member to the upright position when the boat has been offloaded from the trailer.

6. The apparatus in claim 1, wherein the counterweight comprises a solid material positioned at the lower end of the body portion, the solid material defining sufficient weight for moving the reflective member from the horizontal to the upright position when the trailer is unloaded.

7. An apparatus in combination with a boat trailer for guiding the trailer into position for loading, and for assisting in the backing of the trailer when the trailer has been unloaded, the apparatus comprising:
   a) a body portion, having a pair of spaced apart leg members, lower ends of the leg members hingedly secured to a rear end of the boat trailer to straddle the midline of the trailer, said body portion movable between upright and horizontal positions;
   b) a reflective member positioned on upper ends of the leg members, said reflective member movable between the upright position and the horizontal position, the reflective member having a flat reflective face portion viewable from the cab of a vehicle towing the trailer while the reflective member is in the upright position; and
   c) a spring member engaged between the body portion and the trailer for biasing the reflective member in the upright position when a boat has been offloaded from the trailer.

8. The apparatus in claim 7, wherein lower ends of the leg members comprise weighted material for defining a counter weight for maintaining the body portion in the upright position when the trailer is empty, and moveable to the horizontal position when a boat is loaded onto the trailer.

9. The apparatus in claim 7, wherein the reflective member is positioned on the trailer midline so as to provide a reference point for a person driving the vehicle towing the trailer to determine the midpoint of the trailer as it is positioned to receive a boat.

10. The apparatus in claim 7, wherein the reflective member comprises a large circular body having a reflective material thereon.

11. An apparatus in combination with a trailer and a boat for guiding the trailer into position for loading, and for assisting in the backing of the trailer when the trailer has been unloaded, the apparatus comprising:
   a) a body portion, comprising a pair of spaced apart leg members, lower ends of the leg members hingedly secured to a rear end of the trailer to straddle the midline of the trailer, said body portion movable between a normally upright position and a horizontal position;
   b) a reflective member positioned on upper ends of the leg members, said reflective member movable between the upright position and the horizontal position, the reflective member further comprising at least one flat circular reflective face viewable from the cab of a vehicle towing the trailer while the reflective member is in the upright position; and
   c) the lower ends of the leg members comprising weighted material for defining a counterweight for maintaining the body portion in the normally upright position when the trailer is empty, and movable to the horizontal position when the boat is loaded onto the trailer; wherein
   the boat is slidable upon the trailer, so that when the boat makes contact with the body portion while in the upright position, the body portion moves to the horizontal position and is maintained in that position until the boat is offloaded from the trailer.

12. The apparatus in claim 11 further comprising a spring member engaged between the body portion and the trailer for biasing the reflective member in the normally upright position.

13. The apparatus in claim 11, wherein the reflective members is positioned on the trailer midline so as to provide a reference point for a person driving the vehicle towing the trailer to determine the midpoint of the trailer as it is positioned to receive the boat.

* * * * *